(12) United States Patent
List et al.

(10) Patent No.: US 11,943,450 B2
(45) Date of Patent: Mar. 26, 2024

(54) SYSTEM AND METHOD TO ESTIMATE BLOCKINESS IN TRANSFORM-BASED VIDEO ENCODING

(71) Applicant: DEUTSCHE TELEKOM AG, Bonn (DE)

(72) Inventors: Peter List, Unna (DE); Rakesh Ramachandra, Ilmenau (DE); Werner Robitza, Vienna (AT); Alexander Raake, Berlin (DE); Steve Goering, Menteroda (DE); Ulf Wuestenhagen, Gruenheide (DE); Bernhard Feiten, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 251 days.

(21) Appl. No.: 17/629,481

(22) PCT Filed: Jul. 23, 2020

(86) PCT No.: PCT/EP2020/070834
§ 371 (c)(1),
(2) Date: Jan. 24, 2022

(87) PCT Pub. No.: WO2021/013946
PCT Pub. Date: Jan. 28, 2021

(65) Prior Publication Data
US 2022/0295074 A1    Sep. 15, 2022

(30) Foreign Application Priority Data

Jul. 24, 2019  (EP) .................................... 19188067

(51) Int. Cl.
*H04N 19/154*    (2014.01)
*H04N 19/124*    (2014.01)
(Continued)

(52) U.S. Cl.
CPC ......... *H04N 19/154* (2014.11); *H04N 19/124* (2014.11); *H04N 19/18* (2014.11); *H04N 19/60* (2014.11); *H04N 19/86* (2014.11)

(58) Field of Classification Search
CPC .... H04N 19/176; H04N 19/61; H04N 19/124; H04N 19/70; H04N 19/117; H04N 19/18;
(Continued)

(56) References Cited

U.S. PATENT DOCUMENTS

2006/0133479 A1    6/2006  Chen et al.
2009/0080798 A1    3/2009  Maurer et al.
(Continued)

FOREIGN PATENT DOCUMENTS

| CN | 1794815 A | 6/2006 |
|---|---|---|
| CN | 101874409 A | 10/2010 |
| CN | 103444179 A | 12/2013 |

OTHER PUBLICATIONS

Wenfeng Gao et al: "A de-blocking algorithm and a blockiness metric for highly compressed images", IEEE Transactions on Circuits and Systems for Video Technology, vol. 12. No. 12, Dec. 1, 2002 (Dec. 1, 2002), pp. 1150-1159, XP055575403, us ISSN: 1051-8215, DOI: 10.1109/TCSVT.2002.806817 section III; p. 1152-p. 1154.

(Continued)

*Primary Examiner* — Farhan Mahmud
(74) *Attorney, Agent, or Firm* — LEYDIG, VOIT & MAYER, LTD.

(57) ABSTRACT

A method for estimating blockiness in a video frame of transform-based video encoding includes: obtaining a bitstream of a transform coded video signal, the signal being partitioned into video frames and all operations being performed on a per frame basis, wherein coefficients constituting transforms encoded in the bitstream of the video frames (Continued)

are read; averaging the coefficients of the transforms encoded in the bitstream into one averaged transform matrix per transform block size i; generating or making available one weighting matrix per averaged transform of block size i; computing intermediate weighted average transform matrices; processing all members of each weighted and averaged transform matrix into a single value per transform of block size i, to obtain intermediate signals; and computing a single value by weighting values of the intermediate signals according to an area in the respective video frame and adding up the weighted values of the intermediate signals.

10 Claims, 4 Drawing Sheets

(51) Int. Cl.
  *H04N 19/18* (2014.01)
  *H04N 19/60* (2014.01)
  *H04N 19/86* (2014.01)

(58) Field of Classification Search
  CPC .... H04N 19/147; H04N 19/136; H04N 19/46; H04N 19/593; H04N 19/14; H04N 19/44
  See application file for complete search history.

(56) References Cited

U.S. PATENT DOCUMENTS

| | | | |
|---|---|---|---|
| 2010/0054330 A1* | 3/2010 | Chen | H04N 19/126 375/240.03 |
| 2012/0177301 A1 | 7/2012 | Shin et al. | |
| 2013/0128993 A1* | 5/2013 | Kau | H04N 19/48 375/240.26 |
| 2018/0220158 A1 | 8/2018 | Koo et al. | |

OTHER PUBLICATIONS

Bovik AC et al: "DCT-domain blind measurement of blocking artifacts in DCT-coded images", 2001 IEEE International Conference on Acoustics, Speech, and Signal Processing. Proceedings. (ICASSP). Salt Lake City, UT, May 7-11, 2001; [IEEE International Conference on Acoustics, Speech, and Signal Processing (ICASSP)], New York, NY: IEEE, US, vol. 3, May 7, 2001 (May 7, 2001), pp. 1725-1728, XP010802872, DOI: 10.1109/ICASSP.2001.941272 ISBN: 978-0-7803-7041-8 the whole document.

Zhu Kongfeng et al: "No-Reference Video Quality Assessment Based on Artifact Measurement and Statistical Analysis", IEEE Transactions on Circuits and Systems for Video Technology, Institute of Electrical and Electronics Engineers, US, vol. 25, No. 4, Apr. 1, 2015 (Apr. 1, 2015), pp. 533-546, XP011577260, ISSN: 1051-8215, DOI: 10.1109/TCSVT.2014.2363737 [retrieved on Apr. 1, 2015] p. 535-p. 540.

Zhang Bo, Research on HD Video Frame Rate Up-Conversion Algorithm and Deblocking Algorithm, China Academic Journal Electronic Publishing House, Sep. 19, 2017, pp. 1-71, Beijing Jiaotong University.

Zhang Tao, Research on high efficiency intra coding in video compression, TP391.41, Dissertation for the Doctoral Degree in Engineering, China Academic Journal Electronic Publishing House, Jan. 2017, pp. 1-158, Harbin Institute of Technology.

Kai Zhang et al., Enhanced Cross-Component Linear Model for Chroma Intra-Prediction in Video Coding, TIP-17767-2017, IEEE Transactions on Image Processing, Apr. 2018, pp. 1-13.

* cited by examiner

Fig. 1

| 0.0 | 0,375 | 0.5 | 0.625 |
|---|---|---|---|
| 0.375 | 0.5 | 0.625 | 0.75 |
| 0.5 | 0.625 | 0.75 | 0.875 |
| 0.625 | 0.75 | 0.875 | 1.0 |

Fig. 2A

| 0.0 | 0.188 | 0.25 | 0.313 | 0.375 | 0.438 | 0.5 | 0.563 |
|---|---|---|---|---|---|---|---|
| 0.188 | 0.25 | 0.313 | 0.375 | 0.438 | 0.5 | 0.563 | 0.625 |
| 0.25 | 0.313 | 0.375 | 0.438 | 0.5 | 0.563 | 0.625 | 0.688 |
| 0.313 | 0.375 | 0.438 | 0.5 | 0.563 | 0.625 | 0.688 | 0.75 |
| 0.375 | 0.438 | 0.5 | 0.563 | 0.625 | 0.688 | 0.75 | 0.813 |
| 0.438 | 0.5 | 0.563 | 0.625 | 0.688 | 0.75 | 0.813 | 0.875 |
| 0.5 | 0.563 | 0.625 | 0.688 | 0.75 | 0.813 | 0.875 | 0.938 |
| 0.563 | 0.625 | 0.688 | 0.75 | 0.813 | 0.875 | 0.938 | 1.0 |

Fig. 2B

| 0.0 | 0.141 | 0.25 | 0.391 |
|---|---|---|---|
| 0.141 | 0.25 | 0.391 | 0.563 |
| 0.25 | 0.391 | 0.563 | 0.766 |
| 0.391 | 0.563 | 0.766 | 1.0 |

Fig. 3A

| 0.0 | 0.035 | 0.063 | 0.098 | 0.141 | 0.191 | 0.25 | 0.316 |
|---|---|---|---|---|---|---|---|
| 0.035 | 0.063 | 0.098 | 0.141 | 0.191 | 0.25 | 0.316 | 0.391 |
| 0.063 | 0.098 | 0.141 | 0.191 | 0.25 | 0.316 | 0.391 | 0.473 |
| 0.098 | 0.141 | 0.191 | 0.25 | 0.316 | 0.391 | 0.473 | 0.563 |
| 0.141 | 0.191 | 0.25 | 0.316 | 0.391 | 0.473 | 0.563 | 0.66 |
| 0.191 | 0.25 | 0.316 | 0.391 | 0.473 | 0.563 | 0.66 | 0.766 |
| 0.25 | 0.316 | 0.391 | 0.473 | 0.563 | 0.66 | 0.766 | 0.879 |
| 0.316 | 0.391 | 0.473 | 0.563 | 0.66 | 0.766 | 0.879 | 1.0 |

Fig. 3B

| 0.0   | 0.642 | 0.741 | 0.822 |
|-------|-------|-------|-------|
| 0.642 | 0.741 | 0.822 | 0.890 |
| 0.741 | 0.822 | 0.890 | 0.949 |
| 0.822 | 0.890 | 0.949 | 1.001 |

Fig. 4A

| 0.0   | 0.430 | 0.512 | 0.582 | 0.642 | 0.694 | 0.741 | 0.784 |
|-------|-------|-------|-------|-------|-------|-------|-------|
| 0.430 | 0.512 | 0.582 | 0.642 | 0.694 | 0.741 | 0.784 | 0.822 |
| 0.512 | 0.582 | 0.642 | 0.694 | 0.741 | 0.784 | 0.822 | 0.858 |
| 0.582 | 0.642 | 0.694 | 0.741 | 0.784 | 0.822 | 0.858 | 0.890 |
| 0.642 | 0.694 | 0.741 | 0.784 | 0.822 | 0.858 | 0.890 | 0.921 |
| 0.741 | 0.741 | 0.784 | 0.822 | 0.858 | 0.890 | 0.921 | 0.949 |
| 0.741 | 0.784 | 0.822 | 0.858 | 0.890 | 0.921 | 0.949 | 0.976 |
| 0.784 | 0.822 | 0.858 | 0.890 | 0.921 | 0.949 | 0.976 | 1.001 |

Fig. 4B

SYSTEM AND METHOD TO ESTIMATE BLOCKINESS IN TRANSFORM-BASED VIDEO ENCODING

CROSS-REFERENCE TO PRIOR APPLICATIONS

This application is a U.S. National Phase application under 35 U.S.C. § 371 of International Application No. PCT/EP2020/070834, filed on Jul. 23, 2020, and claims benefit to European Patent Application No. EP 19188067.3, filed on Jul. 24, 2019. The International Application was published in English on Jan. 28, 2021 as WO 2021/013946 A1 under PCT Article 21(2).

BACKGROUND

Among the numerous video- or TV distribution services, IPTV (Internet Protocol TV) and VoD (Video on Demand) are becoming increasingly important. They have mostly replaced analogue or non-packet-based transmission methods, by the use of the "real-time transport protocol" (RTP)-based streaming or HTTP Adaptive Streaming (HAS) protocols. It is a major responsibility of the Internet Service Provider towards both streaming content provider and customer to maintain the quality of its service.

With the transmission of video streams over IPTV and VoD, the overall quality of a received video stream may be degraded due to several factors, including improperly adapted or faulty video encoding and network effects like temporal network congestions, leading to high latency and packet loss, which might subsequently trigger lower throughput, reduction of the transmission bitrate or stalling and video artefacts.

For video streams transmitted through HAS, a video is stored and made available on the server side in different representations (e.g. differing in quality and resolution) aimed at delivery to clients with different bandwidth conditions. The client may choose the proper representation of the video based on its current network and playback buffer state. In HAS, latency or packet loss on the network can result in video buffer depletion at the client side, which may lead to quality switches between representations, or, in the worst case, stalling (rebuffering) presented to the user—typically as a spinning loading indicator.

For video streams transmitted through RTP (over User Datagram Protocol, UDP), a video is often times live encoded at a single bitrate and resolution. Network congestion will easily lead to packet loss, since delayed UDP-packets can be deleted by the network. Losses might be answered with retransmission requests, but these would only be successful at rather low loss rates. If retransmission was not successful, losses can lead to very strong picture artefacts that may spread over most of the display for considerable periods of time. Stalling would only happen if the loss rate was so high, that the decoder on the client side loses synchronization and has to restart again.

The overall streaming quality—as judged by a consumer—is thus influenced by both audio-visual parameters as well as the occurrence of network-based events that trigger quality switches, stalling and packet losses. This application focuses on quality issues that are induced by properties of the video itself and its encoding.

In large IP networks, where millions of video streams are transmitted simultaneously, only fully automated quality monitoring probes that raise alarms in the case of the occurrence of degraded streaming quality, can fulfill the requirement of maintaining service quality for the consumer. Such "monitoring probes" need to be able to estimate the subjective quality that an end user would perceive when consuming the video content. Several models exist or are in development, that translate objective measurement results from a video stream into the subjective "mean opinion score" (MOS) values. These models may operate on the decoded video signal, or on the bitstream of a transmitted and/or received video. This application focuses on the latter kind of model.

For transmission, a video bitstream (elementary stream) is typically wrapped in a container (e.g., as specified in MPEG-4 Part 14). The objective measurement categories that can be used to produce the before mentioned MOS value may be derived from that container, for instance the used codec, bit rate, resolution, and the frame rate of the monitored video. These are in the following called container-based parameters.

The perceived quality of compressed video is however not only dependent on the deployed video codecs, its setting during encoding, and other effects from the transmission chain, but is significantly influenced by properties of the video content itself which is only accessible through the elementary stream of the video. Therefore, using only container-level bitstream measures such as codec, bitrate, resolution, or frame rate can only result in a broad estimation of the quality that a decoded video might have, but cannot achieve high accuracy in predicting the MOS-values, the values with which humans would rate the same video. It is thus necessary to use more advanced and more low-level bitstream measures to better estimate the quality.

Since container-level bitstream measures only have a limited meaning, one needs to access the video elementary bitstream itself to be able to access more meaningful data. For each coded video frame in a video stream, quality can be approximated well as an exponential function of the average quantization parameter (QP):

$$\text{Quality} \sim 1/\exp(a*QP+b) \tag{1}$$

This property is available on a per-slice- or per-frame-level of any video-frame and also—if QP was changed by the encoder within the frame—on a per-coding-unit/macroblock-level.

When QP is increased, the video-frame loses its "crispness". Also, more artefacts can be seen, in particular in areas containing edges of high contrast. At very high values of QP, the video not only becomes very blurry, but another effect appears which is additionally degrading the subjective quality in a severe way.

This effect is called "blockiness", because at particularly high values of QP, the underlying structure of the encoding algorithm, which consists of pixel-blocks of for instance 4×4 or 8×8 pixels, becomes visible. Since the human visual system is very sensitive concerning these (unnatural) horizontal and vertical contrast boundaries, which do not belong into the original picture content, blockiness is an additionally degrading effect, which is not covered by quality predicting formulae, if these formulae rely only on QP, as exemplified in (1).

In order to be able to cover the effect of blockiness nevertheless, an additional measure that particularly detects blockiness in a video is needed. This measure can then be included in any formula translating objective measurement results into a quality Mean Opinion Score (MOS) estimation similar to formula (1), or can serve or as a standalone metric to diagnose video quality encoding problems.

To find such a blockiness measure, one has to understand how blockiness arises in the first place. Blockiness is a typical result of "transform-coding", which is deployed in most available video encoders. For transform coding, pixel blocks of 4×4 up to 32×32 are subjected to 2-dimensional transforms, which are typically discrete cosine transforms (DCTs) that transform content from the spatial domain into the frequency domain. Since lower frequencies usually have a much higher amplitude than higher frequencies, as a result of such transforms, values with significant amplitude are concentrated in the upper left corner of the transform matrix, which represents the lower frequency components and can make bitstream encoding much more efficient in the steps following transformation.

The values of the transform matrix are then quantized. If quantization is very coarse (QP is large), the usually small high frequency transform-coefficients are mainly quantized to zero. This means that the transformed and quantized block will mostly consist of low frequency components; in many cases only the DC-value in the upper left corner is present. In any case, the fewer high frequencies had been present, the less two neighbouring re-transformed blocks will "smoothly" fit together. In the extreme case that only the DC-values were coded, the re-transformed blocks have a single flat colour, and even the slightest difference in DC-coefficient amplitude will result in a visible edge between neighbouring blocks.

Still, even large QP values do not necessarily generate blocking artefacts. There are situations with high QP and no blocking visible at all. These situations may, for instance, occur in scenes with a very small amount of motion, when a high-quality Intra- or key-frame was sent and the subsequent predicted frames—which reference that Intra-frame—can reach high quality, just from copying the original Intra-frame content. Since copying requires no residual coding and therefore no quantization, it does not even matter in this situation, which size the QP value has, since it is not used, at least not for the static parts of the video-frame. In general, the QP would be high though, since the encoder may want to avoid to just code noise (with a small QP).

In contrast to this are scenes with very high and/or complex motion, where—at lower bit rates—most of the available bits are required for the coding of motion, so that the rate-control can only leave few bits for transform-coefficients. As a consequence, QP would be as large as possible and blockiness would usually be large as well.

In practice, every video-frame is between these two extremes, but the value of QP can only inadequately specify the amount of blockiness. So, an additional blockiness measure could indeed enhance the precision of any video quality estimation model based on bitstream data.

US 2013/128993 A1 describes a method of evaluating perceptual visual quality of compressed video bit streams in the H.262 or H.264 formats, by deploying information read directly from the video bitstream, but without decoding the video. In this publication, the main criteria for blockiness is the DC-coefficient difference of two adjacent transform blocks divided by the weighted sum of all AC-coefficients in those transform blocks. In principle, differences of adjacent DC-values are a meaningful measure, but without (almost) complete decoding of a video-frame, DC-values are only available for intra-coded blocks which are reliably present only in intra-frames. Therefore, for most of the video frames which are predicted, a blockiness parameter could not be measured.

The quality of intra-frames is mostly similar to predicted frames, but this is only true if the encoder rate-control is perfectly in balance and no unpredictable changes in complexity (like sudden motion) occur in the video.

SUMMARY

In an exemplary embodiment, the present invention provides a method for estimating blockiness in a video frame of transform-based video encoding. The method includes: obtaining a bitstream of a transform coded video signal, the signal being partitioned into video frames and all operations being performed on a per frame basis, wherein coefficients constituting transforms encoded in the bitstream of the video frames are read; averaging the coefficients of the transforms encoded in the bitstream into one averaged transform matrix per transform block size i; generating or making available one weighting matrix per averaged transform of block size i, comprising weighting factors; computing intermediate weighted average transform matrices by processing each averaged transform matrix with the corresponding weighting matrix; processing all members of each weighted and averaged transform matrix into a single value per transform of block size i, to obtain intermediate signals Bls[i]; and computing a single value $Bl_0$ by weighting values of the intermediate signals Bls[i] according to an area in the respective video frame and adding up the weighted values of the intermediate signals Bls[i]. The area is the area which the quantity of the transform matrices of block size i cover per video frame. This area is dependent on the number of transforms of a specific block size i, NTr[i], in the examined frame and the number of pixels each of these transforms covers. $Bl_0$ is computed using the formula $Bl_0$=Bls[4×4]* NTr[4×4]+4*Bls[8×8]*NTr[8×8]+16*Bls[16×16]*NTr[16× 16]+ . . . Blockiness is further estimated as $Bl_1$ using a factor C(QP) dependent on a frame averaged quantization parameter QP and a codec dependent maximum QP, QP_max, where C(QP) is defined as C=exp (5*((QP_max−QP)/QP_ max)), wherein $Bl_1$=$Bl_0$*C(QP).

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In the present invention, absolute values of DC-coefficients are not considered. Therefore, blockiness can be measured on every frame of a compressed video.

Exemplary embodiments of the present invention provide a system and method to estimate blockiness in transform-based video encoding on a frame by frame basis with no regard to the frame-type. The resulting indicator is considered as an addition to any bitstream-based method of quality estimation, in order to make its result more precise, or as a standalone metric to diagnose video quality encoding problems.

An exemplary embodiment of the present invention relates to a method to estimate blockiness in a video frame of transform-based video encoding. The method comprises the following steps:

- obtaining a bitstream of a transform coded video signal, the signal being partitioned into video frames and all operations being performed on a per frame basis, wherein coefficients constituting transforms encoded in the bitstream of the video frames are read,
- averaging the coefficients of the transforms encoded in the video bitstream into one averaged transform matrix per transform block size i.
- generating or making available one weighting matrix per averaged transform of block size i comprising weighting factors.
- computing intermediate weighted average transform matrices by processing each averaged transform matrix with the corresponding weighting matrix.
- processing all members of each weighted and averaged transform matrix into a single value per transform of block size i, to obtain an intermediate signal Bls[i].
- computing a single value $Bl_0$ by weighting the values of the intermediate signal Bls according to an area in the respective video frame and adding up the weighted Bls[i].
- the area is the area which the quantity of the transform matrices of block size i cover per video frame, and wherein the area is dependent on the number of transforms of a specific block size i, NTr[i], in the examined frame and the number of pixels each of these transforms covers.
- Blockiness is further estimated as Bl1 using a factor C(QP) dependent on a frame averaged quantisation parameter QP and a codec dependent maximum QP, QP_max, were C(QP) is defined as $C=\exp(5*((QP\_max-QP)/QP\_max))$, and $Bl1=Bl0*C(QP)$.

The method may further comprise multiplying $Bl_0$ with a QP-dependent term: $Bl_1=Bl_0*C(QP)$, where QP is the averaged quantization parameter of the video frame. This operation is performed in order to avoid false blockiness detection for low values of QP.

Transforming $Bl_1$ into a more convenient form, Bl, may be achieved by applying an inverse operation like $Bl=1/(1+Bl_1)$, in order to restrict the range of Bl from zero, for no blockiness, to one for high blockiness.

Exemplary embodiments of the invention further relate to a data processing apparatus which comprises components for carrying out the method described above.

The invention further relates to a system for estimating blockiness in a video frame of transform-based video encoding. The system comprises data processing means configured to obtain a bitstream of a transform coded video signal, the signal being partitioned into video frames. The coefficients constituting transforms encoded in the video frames are read. Averaging means are configured to average the transforms into one averaged transform matrix per transform size i. Weighting means are configured to generate or compute weighting matrices or make weighting matrices available. The weighting means are further configured to compute intermediate averaged and weighted transform matrices by processing the averaged transform matrices with a corresponding weighting matrix of the same block size i.

Computing means are configured to process all members of the averaged and weighted transform matrices into a single value per transform block size i, to obtain an intermediate signal Bls[i]. The computing means are further configured to compute a single value $Bl_0$ by weighting the members of the intermediate signal Bls[i] according to an area in the respective video frame, and adding up the weighted Bls[i]. Hence, a weighted sum $Bl_0$ of all Bls[i] may be calculated, where the weighting may be according to the area that the transforms of block size i cover in the current video frame, so that the weighting will be proportional to the number of transforms of a specific block size i in the examined frame and the number of pixels that each transform of block size i covers.

Processing means may be configured to multiply the intermediate blockiness value $Bl_0$ with a term dependent on the averaged quantization parameter QP resulting in an intermediate Blockiness value $Bl_1$, which avoids false blockiness detection at low values of QP, and finally applying an inverse operation like $Bl=1/(1+Bl_1)$ to restrict the range of Bl to values from 0 for "no blockiness" to 1 for "high blockiness".

Thus, the system may be adapted to and comprise components configured to carry out the method steps described above.

Exemplary embodiments of the invention provide a method to estimate on a per-frame basis of a compressed video sequence, an indicator value which reflects the assumed blockiness in each frame. This indicator can serve conveniently as an addition to any bitstream-based method of quality estimation, to make its result more precise.

As described above, blockiness is the consequence of a lack of high frequency coefficients of the transformed and quantized picture content. The measure therefore relies on a weighted sum of the coefficients of averaged transform-blocks, where the weighting increases with the frequency the transform-coefficient is representing. If the result of such a weighted sum is very small or even zero, this is a sufficient sign that no or very few higher frequency coefficients are present in the transform, and therefore blockiness is likely to be observed.

Figure 1:
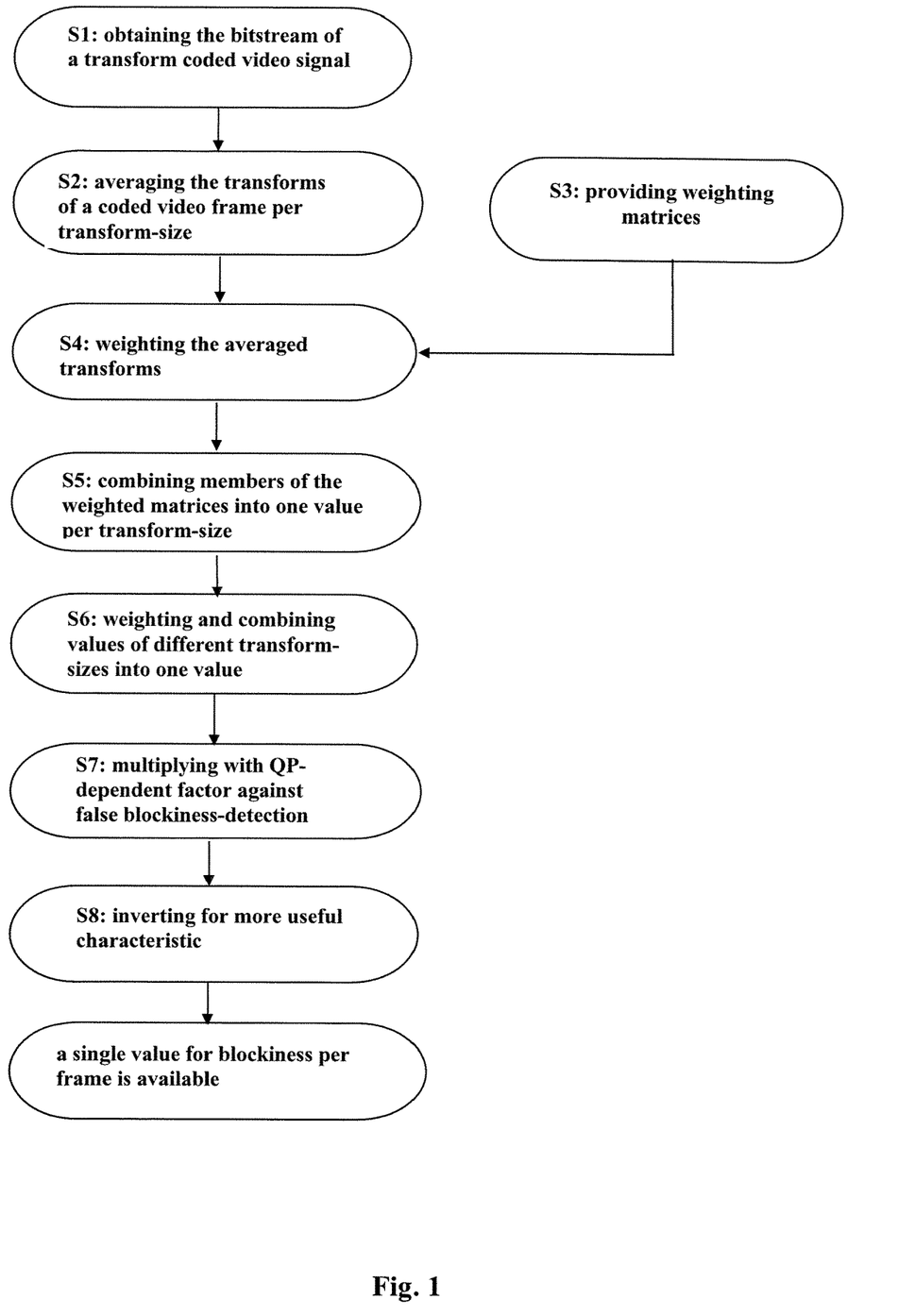
FIG. 1 shows a flowchart of method steps according to an embodiment of the invention.

As shown in the embodiment of FIG. 1, the bitstream of a transform coded video signal is obtained (S1) as a first step and the signal is partitioned into video frames. For each video frame, the coded transform coefficients, which are part of the bitstream, are read.

In a second step, an averaging of all the read transforms in a frame is performed (S2). Here, only the amplitudes of the coefficients (the absolute values) are taken into account. After this process, for every occurring transform block size i, there is one averaged coefficient matrix available. Intra-blocks in predicted frames are not taken into account, because they tend to have different statistical properties.

In a third step, weighting matrices are made available (S3), one for every occurring transform block size. For a convenient description, the elements of the averaged coefficient-matrix and the weighting matrix are indexed by the two indexes for the matrix-row $r=1 \ldots size_r$, and the matrix column $c=1 \ldots size_c$, where $size_r$ and $size_c$ are the size of the transform in vertical and horizontal direction. For the time being, both sizes have the possible values 4, 8, 16, and 32. Larger sizes are possible, but not yet used in any available video encoding algorithm. Consequently, the number $size_{max}=32$ for now.

The weighting matrices may be designed in order to amplify high frequency coefficients and diminish low frequency coefficients. Matrices with logarithmic, linear or quadratic characteristics are recommended solutions, which are exemplified below.

In established video compression standards, like MPEG-2, H.264, HEVC or VP9, two dimensional transforms are defined as a square. Only the recently introduced AV1 uses a combination of different vertical and horizontal sizes.

Figure 2A:
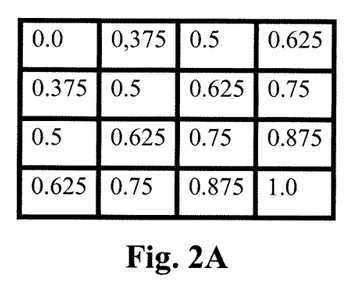
FIGS. 2A and 2B show two exemplary weighting matrices for linear weighting.
Figure 2B:
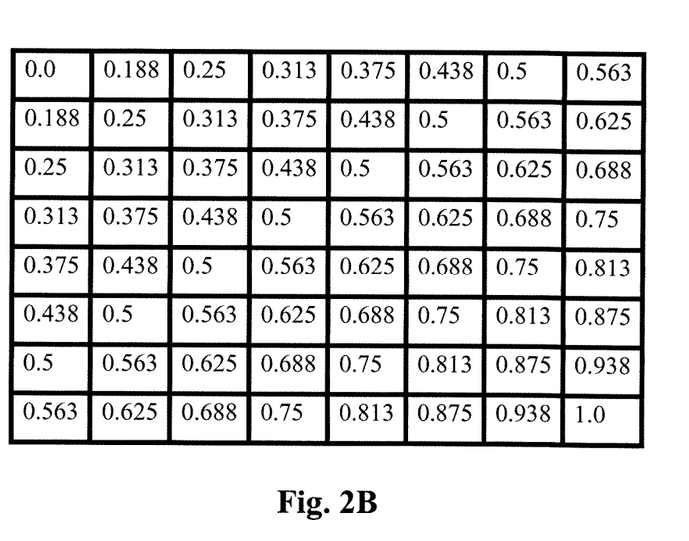

Apart from the rule that the higher the frequency of a coefficient, the higher the weighting, different weighting-algorithms are conceivable. Three different algorithms to create a possible weighting-table are described below. Other possibilities include predefined "hand-filled" or automatically optimized tables.

a) Linear weighting: the weighting increases linearly with the frequency a coefficient represents. FIGS. 2A and 2B show exemplary weighting matrices.

The weighting-factors W for the two-dimensional weighting-matrix are defined by:

if((r==1)&&(c==1))

$$W_{lin}(r,c)=0$$

else $$W_{lin}(r,c)=r*(size_{max}/size_r)+c*(size_{max}/size_c)/2*size_{max}$$

Figure 3A:
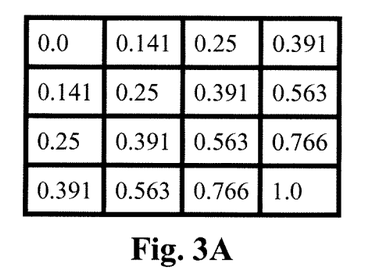
FIGS. 3A and 3B show two exemplary weighting matrices for quadratic weighting.
Figure 3B:
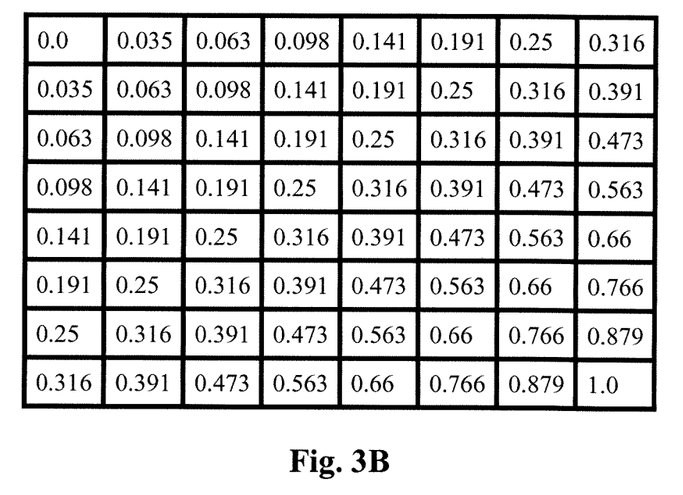

With this formula, the diagonal lines from top right to bottom left—which represent coefficients with similar frequency dependency—are assigned the same value, raising from 0.0 in the upper left corner to 1.0 in the bottom right corner. In FIGS. 2A and 2B this is exemplified for 4×4 and 8×8 matrices.

b) Quadratic Weighting:

$$W_{sqr}(r,c)=W_{lin}(r,c)*W_{lin}(r,c)$$

Figure 4A:
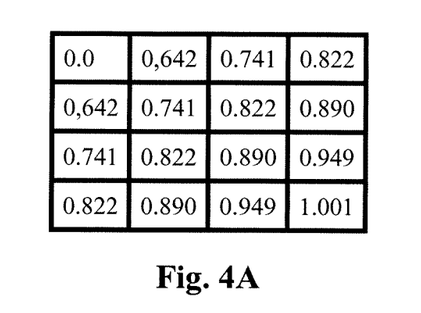
FIGS. 4A and 4B show two exemplary weighting matrices for logarithmic weighting.
Figure 4B:
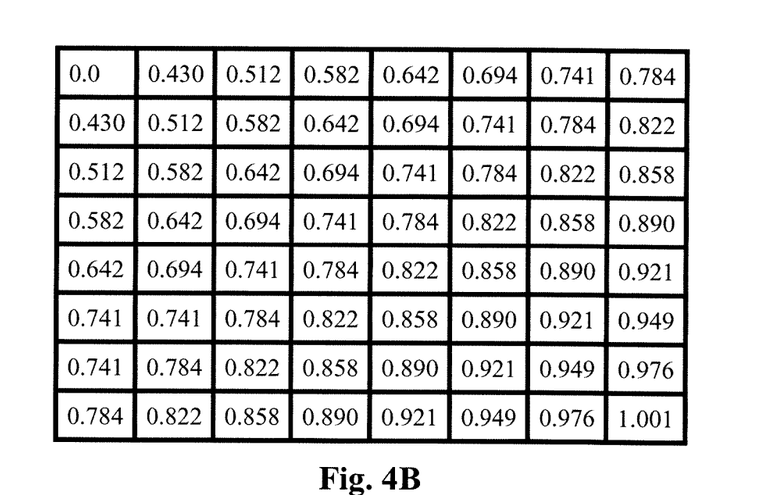

With this weighting low frequency coefficients are even weighted less than with linear weighting. FIGS. 3A and 3B exemplify this for 4×4 and 8×8 matrices.

c) Logarithmic weighting:

$$W_{log}(r,c)=\ln(a*W_{lin}(r,c)+1)/b$$

As an example, in FIGS. 4A and 4B, logarithmic weighting is exemplified for a=9 and b=2.3. Using logarithmic weighting, coefficients with medium frequency are weighted stronger than with linear weighting.

According to FIG. 1, in a fourth step, the weighting process takes place (S4). For this purpose, the averaged absolute coefficient-matrices (one for each transform block size) are multiplied value by value with the corresponding weighting matrix values.

In a fifth step the members of the resulting weighted matrices are processed (S5) into one value Bls[i] per transform-size i. Bls may be called an intermediate signal. Processing may be performed by adding up all members of each averaged and weighted transform matrix into one value Bls[i] per transform-size i. For normalizing purposes, these results Bls[i] may then be divided by the number of nonzero coefficients in the corresponding averaged coefficient matrix.

In a sixth step the intermediate results Bls[i], are then merged into one final result. For this process, the intermediate results Bls[i] are weighted (S6) according to the area the corresponding transforms of block size i cover in the video frame, which is proportional to the number of transforms of that specific size i in the examined frame, NTr[i], and the number of pixels each transform covers.

$$Bl_0=Bls[4\times4]*NTr[4\times4]+4*Bls[8\times8]*NTr[8\times8]+16*Bls[16\times16]*NTr[16\times16]\ldots$$

The resulting $Bl_0$ is a good indicator for a lack of high frequency transform-coefficients and thus for blockiness. Still, as mentioned above, there is the possibility that even with relatively low values of QP, no high frequency coefficients need to be transmitted, without any visible blockiness.

Each video frame may be coded with a different transform size i. The "area" denotes the area which theses transforms with size i cover in a video frame. It may be computed from the block size of the transformation (e.g. block size 16, i.e. area=16×16 pixel) and the number of transforms with that size (NTr[i]) in the video frame.

In a seventh step the result $Bl_0$ may therefore be made more reliable. Since the probability of blockiness is reduced with a decreasing value of QP, this effect can be taken into account, by multiplying $Bl_0$ with a term C(QP) (S7), which is 1.0 for the maximum QP value, QP_Max, (with the maximum probability for blockiness) and which increases exponentially for lower values of QP.

$$C=\exp(5.0*((QP\_Max-QP)/QP\_Max))$$

$$Bl_1=Bl_0*C$$

As a consequence, $Bl_1$ is only marginally influenced by C(QP) for that range of QP, where blockiness has a high probability, but is increased significantly for small values of QP.

In a final step $Bl_1$ is transformed (S8) in order to make it more convenient to be used. The measure $Bl_1$ gets smaller and smaller, the fewer high frequency coefficients are present in a video frame. For a video frame with strong blockiness, it will generally be zero or very close to zero. For high-quality video it can reach values of several hundreds. This property makes the parameter unfavourable for any further use in a MOS-model. Therefore, $Bl_1$ may be converted to $$Bl=1.0/(1.0+Bl_1)$$

This final version of the blockiness measure, Bl, is a real number and varies in the range of [0, 1], where 0 is the lowest blockiness and 1 is maximal blockiness. For higher picture quality, it quickly decreases to values close to zero.

The present invention also relates to a system for carrying out the method described above. Furthermore, a data processing apparatus comprising components for carrying out the method described above is also encompassed by the invention.

Other aspects, features, and advantages will be apparent from the disclosure of the present application.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The invention claimed is:

1. A method for estimating blockiness in a video frame of transform-based video encoding, the method comprising:

obtaining a bitstream of a transform coded video signal, the signal being partitioned into video frames and all operations being performed on a per frame basis, wherein coefficients constituting transforms encoded in the bitstream of the video frames are read;

averaging the coefficients of the transforms encoded in the bitstream into one averaged transform matrix per transform block size i;

generating or making available one weighting matrix per averaged transform of block size i, comprising weighting factors;

computing intermediate weighted average transform matrices by processing each averaged transform matrix with the corresponding weighting matrix;

processing all members of each weighted and averaged transform matrix into a single value per transform of block size i, to obtain intermediate signals Bls[i]; and computing a single value $Bl_0$ by weighting values of the intermediate signals Bls[i] according to an area in the respective video frame and adding up the weighted values of the intermediate signals Bls[i];

wherein the area is the area which the quantity of the transform matrices of block size i cover per video frame, and wherein this area is dependent on the number of transforms of a specific block size i, NTr[i], in the examined frame and the number of pixels each of these transforms covers, and wherein $Bl_0$ is computed using the formula $$Bl_0 = Bls[4\times4]*NTr[4\times4] + 4*Bls[8\times8]*NTr[8\times8] + 16*Bls[16\times16]*NTr[16\times16] + \ldots;$$

wherein blockiness is further estimated as $Bl_1$ using a factor C(QP) dependent on a frame averaged quantization parameter QP and a codec dependent maximum QP, QP_max, where C(QP) is defined as C=exp (5* ((QP_max−QP)/QP_max)); and wherein $Bl_1 = Bl_0 * C(QP)$.

2. The method according to claim 1, wherein the weighting step is performed using linear, quadratic or logarithmic weighting, or using predefined weighting matrices;

wherein for linear weighting, the weighting increases linearly with the frequency a coefficient of the transform matrix to be weighted represents;

wherein for quadratic weighting, the weighting increases quadratically with the frequency a coefficient of the transform matrix to be weighted represents; and wherein for logarithmic weighting, the weighting increases logarithmically with the frequency a coefficient of the transform matrix to be weighted represents.

3. The method according to claim 1, wherein the processing of each averaged transform matrix with the corresponding weighting matrix is performed by multiplying both matrices value by value.

4. The method according to claim 1, wherein the processing of each averaged and weighted transform matrix of block size i to obtain the intermediate signals Bls[i] is performed by adding up all averaged and weighted coefficients of the matrix into one result.

5. The method according to claim 1, wherein blockiness Bl is computed as $Bl = 1/(1+Bl_1)$, so that Bl becomes 1 in case of maximal blockiness and 0 for minimal blockiness.

6. A system for estimating blockiness in a video frame of transform-based video encoding, the system comprising:

data processing means configured to obtain a bitstream of a transform coded video signal, the signal being partitioned into video frames and all operations being performed on a per frame basis, wherein coefficients constituting transforms encoded in the video signal frames are read;

averaging means configured to average the coefficients of the transforms encoded in the bitstream into one averaged transform matrix per transform block size i;

weighting means configured to generate or make available one weighting matrix per averaged transform of block size i, comprising weighting factors, wherein the weighting means are further configured to compute intermediate weighted and averaged transform matrices by processing each averaged transform matrix with the corresponding weighting matrix;

computing means configured to compute all members of each weighted and averaged transform matrix into a single value per transform of block size i, to obtain intermediate signals Bls[i]; and computing means configured to compute a single value $Bl_0$ by weighting values of the intermediate signals Bls[i] according to an area in the respective video frame and adding up the weighted values of the intermediate signals Bls[i], wherein the area is the area which the quantity of transform matrices of block size i cover per video frame, wherein this area is dependent on the number of transforms of a specific size i, NTr[i], in the examined frame and the number of pixels each of these transforms covers, and wherein $Bl_0$ is computed using the formula $$Bl_0 = Bls[4\times4]*NTr[4\times4] + 4*Bls[8\times8]*NTr[8\times8] + 16*Bls[16\times16]*NTr[16\times16] + \ldots;$$

wherein blockiness is further estimated as $Bl_1$ using a factor C(QP) dependent on a frame averaged quantization parameter QP and a codec dependent maximum QP, QP_max, where C(QP) is defined as C=exp (5*((QP_max−QP)/QP_max)); and wherein $Bl_1 = Bl_0 * C(QP)$.

7. The system according to claim 6, wherein the weighting means is configured to compute the intermediate weighting matrices using linear, quadratic or logarithmic weighting, or using predefined weighting matrices;
   wherein for linear weighting, the weighting increases linearly with the frequency a coefficient of the transform matrix to be weighted represents;
   wherein for quadratic weighting, the weighting increases quadratically with the frequency a coefficient of the transform matrix to be weighted represents; and
   wherein for logarithmic weighting, the weighting increases logarithmically with the frequency a coefficient of the transform matrix to be weighted represents.

8. The system according to claim 6, wherein the weighting means is further configured to process each averaged transform matrix with the corresponding weighting matrix by multiplying both matrices value by value.

9. The system according to claim 6, wherein the computing means is configured to process each averaged and weighted transform matrix i to obtain the intermediate signals Bls[i] by adding up all coefficients of that matrix into one result.

10. The system according to claim 6, wherein blockiness Bl is computed as $Bl = 1/(1+Bl_1)$, so that Bl becomes 1 in case of maximal blockiness and 0 for minimal blockiness.

\* \* \* \* \*